United States Patent Office 2,849,284
Patented Aug. 26, 1958

2,849,284

METHOD OF SEPARATING URANIUM SUSPENSIONS

Eugene P. Wigner, Chicago, Ill., and William A. McAdams, Richland, Wash., assignors to the United States of America as represented by the United States Atomic Energy Commission No Drawing. Application March 29, 1945
Serial No. 585,574

2 Claims. (Cl. 23—14.5)

This invention relates to the separation of matter, and particlarly to the separation of colloidal uranous oxides in suspension in deuterium oxide from the deuterium oxide.

It is known that element $94^{239}$, usually referred to as plutonium, can be produced in a device known as a neutronic reactor. In such a device, which includes a uranous material and a moderator, the isotope $U^{235}$ can be split or fissioned by bombardment with thermal neutrons, i. e., neutrons in thermal equilibrium with the surrounding medium, to provide a self-sustaining chain reacting system. In a properly designed neutronic reactor the fission neutrons produced give rise to new fission neutrons in sufficiently large numbers to overcome the neutron losses in the reactor and from the exterior thereof. However, most of the neutrons generated as a result of the fission process are set free with a very high energy and must be slowed down to thermal energies by a moderator before they are most effective to produce fresh fission by bombardment of additional $U^{235}$ atoms. The moderator used must effectively slow the neutron to thermal energies without much absorption thereby, and, as a result, an appreciable quantity of such neutrons tends to enter the uranium. Deuterium, in the form of deuterium oxide or heavy water, is an ideal moderator in that it has the ability to slow fast neutrons to thermal energy levels with very few collisions and that it has a very low neutron capture cross-section.

During the interchange of neutrons from their point of origin to their point of utilization in fission, neutrons may be lost in four ways; by absorption in the uranium metal or compound, by absorption in the moderator, by absorption in impurities present in the system, and by leakage from the system. Natural uranium and its compounds have a ratio of $U^{235}$ isotope to $U^{238}$ isotope of about 1 to 139. Particularly because of this $U^{238}$ content, natural uranium has an especially strong absorbing power for neutrons when they have been slowed down to moderate velocities or so-called resonance energies. The absorption of neutrons by uranium at these energies is termed the uranium resonance absorption or capture. Neutron capture by the isotope $U^{238}$ does not result in fission, but in the creation of $92^{239}$ which by successive loss of beta particles transforms to $93^{239}$ which further decays to $94^{239}$, the change being effected with half-lives of 23 minutes and 2.23 days respectively. The element $94^{239}$ has a relatively stable nucleus that is fissionable by thermal neutrons in a similar manner to the response of $U^{235}$ to thermal neutrons.

The capture of neutrons by the $U^{235}$ content of natural uranium, not only releases neutrons for maintaining the self-sustaining chain reaction, but also releases fission fragments or products comprising new elements in accordance with the following reaction:

$92^{U^{235}}$+neutron=$A$+$B$+about 2 neutrons (average).
$A$="Light" fission fragment, e. g., Br, Kr, Rb, Sr, Y, Zr, Cb, Mo, 43, Ru, Rh. Atomic mass, 83–99, inclusive. Atomic number 35–45, inclusive.
$B$="Heavy" fission fragment, e. g., Sb, Te, I, Xe, Cs, Ba, La, Ce, Pr, Nd. Atomic mass, 127–141, inclusive. Atomic number, 51–60, inclusive.

These fission fragments are highly radioactive and are useful as a source of gamma radiation such as in X-ray therapy, for radiographic work, and other similar purposes.

These products of the neutronic reactor, i. e., the fission fragments, $92^{239}$, $93^{239}$, and $94^{239}$ are formed in the uranium while in situ and means must be provided for removing the irradiated uranium from the reactor in order that these reaction products can be separated from the uranium. The uranium compounds used, with or without the reaction products included, are hereinafter called uranous material.

One form of neutronic reactor in which this invention is particularly useful involves the utilization of the uranium-containing material in the form of a uranium oxide such as uranous oxide ($UO_2$), uranyl oxide ($UO_3$), uranyl uranate ($U_3O_8$) or mixtures thereof. These uranium oxides will hereafter be referred to as the lower oxides of uranium to distinguish them from the peroxide of uranium, $UO_4$. This uranium-containing material in a finely divided state with a preferred original particle size below 2 microns is suspended in an aqueous moderator such as deuterium oxide to form a slurry which is circulated through the reactor and a heat exchange system. Because of abrasion between particles, the particle size will gradually diminish as the material circulates through the neutronic reactor and the circulatory system. With $U_3O_8$, $UO_2$ or $UO_3$, the preferred ratio by weight is approximately one part oxide to four parts heavy water. On a volume basis, the oxide solids represent about 4 percent of the slurry volume.

The slurry is placed in a reaction tank of sufficient size to contain enough slurry to maintain a chain reaction, and means are provided for withdrawing a portion of the slurry from the tank after the uranium-containing material has been bombarded for a substantial period of time. The slurry solids must then be separated from the deuterium oxide for further processing during which the fission products and plutonium are finally separated from one another. For several reasons it is important that the separation of slurry solids from the deuterium oxide be conducted as quickly as possible. In the first place, considerable heat is evolved in the irradiated slurry. This heat will tend to vaporize $D_2O$ and to cake the slurry and may make separation more difficult. Therefore, where substantial vaporization of the aqueous medium such as $D_2O$ is undesirable, the separation should be accomplished before such caking can take place. It may also be desirable to recover the fission products before material radioactive decay has occurred, so that these products may be used while in a highly radioactive state. Another reason for quick separation is the high cost of deuterium oxide. A certain minimum amount of deuterium oxide must remain in the neutronic reactor, if the chain reaction is to continue. Therefore, the shorter the time of hold-up of the deuterium oxide outside the reactor while being separated, the smaller the amount of said oxide necessary for the entire system.

One object of this invention is to provide a method whereby solids in suspension in a liquid may be quickly separated from said liquid.

A second object of this invention is to provide a method whereby uranium-containing solids in suspension in deuterium oxide may be quickly and efficiently separated from said deuterium oxide.

Another object of this invention is to provide a method of quickly separating the slurry from a neutronic reactor into uranium-containing solids and deuterium oxide in order that the deuterium oxide need only have a short hold-up time outside the reactor.

Still another object of this invention is to provide a method of quickly separating uranium-containing solids from deuterium oxide so that fission products in said uranous solids may be removed before their radioactivity has decayed beyond the point of maximum usefulness.

In a preferred embodiment of the invention the slurry is treated to change the colloidal uranium oxide to $UO_4$, a non-colloidal peroxide which immediately sinks to the bottom of a separation tank. In one example a water soluble peroxide such as hydrogen peroxide in an amount corresponding to at least an equimolecular quantity of uranous oxide in the slurry is added thereto. The mixture is thoroughly stirred and allowed to settle. It will be noted that the reaction is substantially instantaneous and that the solids immediately sink to the bottom of the separation tank. Thus the length of time required in the process is solely dependent upon the time required to add and circulate the peroxide through the slurry whereas the same mixture of slurry requires from two and one-half to four hours to settle without the addition of peroxide.

The mechanism of the separation appears to be as follows: normally the colloidal uranium oxide in the slurry tends to remain in suspension inasmuch as each particle of the oxide acquires an electrical charge, the charges on the particles being the same, that is, negative or positive, whereby the particles tend to repel each other, and as a result they remain in suspension. The force of gravity on the particles causes them to gradually settle despite the electrical charges thereon. However, this settling action is extremely slow requiring considerable periods of time.

Upon addition of the hydrogen peroxide to the slurry, the $UO_3$ therein is changed to $UO_4$ by the reaction $$H_2O_2 + UO_3 \rightarrow UO_4 + H_2O$$

Particles of $U_3O_8$ in the slurry are changed to $UO_4$ by the reaction $$4H_2O_2 + U_3O_8 \rightarrow 3UO_4 + 4H_2O$$

Particles of $UO_2$ are converted to $UO_4$ by the reaction $$2D_2O_2 + UO_2 \rightarrow UO_4 + 2D_2O$$

The particles of $UO_4$ immediately settle to the bottom of the tank, and it is believed that the cause of this phenomena is the failure of these particles to maintain electrical charges such as those acquired by the particles of $UO_3$.

It will be understood that there are several hydrogen isotopes known at present, namely $H^1$, $D^2$ and $T^3$, each of which has a valence of one. Thus, the term "hydrogen peroxide" as used herein is broadly defined to include $H_2O_2$, $D_2O_2$ and $T_2O_2$, and this invention comprehends the use of any hydrogen peroxide for the purpose set forth above. $D_2O_2$ is preferred, however, inasmuch as $D_2O$, formed as a by-product of the reaction, is an ideal neutron moderator for the reasons above discussed.

Likewise, the liquids employed in preparing the slurries employed in carrying out the present invention may be selected from a number of substances. Thus, the liquid used may be any which will at least partially dissolve the peroxide utilized and which does not react with said peroxide or is not oxidized under the conditions employed for the conversion of the uranium oxide to $UO_4$. A suitable example of such a liquid is water.

It may be noted that any peroxide which is soluble in the slurry liquid is effective to convert the colloidal uranous oxides to $UO_4$, thereby causing the solids within the slurry to settle rapidly. Inorganic peroxides are preferred because they are relatively stable.

It will be understood that, if desired, the above described separation process may be supplemented by centrifuging the slurry after the peroxide has been added thereto. By this means the solids may be somewhat more effectively separated from the slurry liquid whereby a greater percentage thereof may be recovered.

While the theory of the separation mechanism set forth herein is based on the best known experimental evidence, the invention is not dependent thereon as additional experimental data later discovered may modify this theory. Furthermore, it will be apparent to those skilled in the art that the colloidal oxides of uranium can be converted to a readily precipitable form by further oxidation of the oxide in accordance with any of several standard procedures, such as, for example, by electrolytic oxidation. The description of the invention is meant to be illustrative only and the scope of the invention is limited only by the appended claims.

What is claimed is:

1. In a process for separating uranium combined as an oxide from colloidal dispersions of the lower oxides of the uranium in a hydrogen oxide medium, the step which comprises contacting the dispersed uranium oxide with a hydrogen peroxide whereby the uranium is converted to a non-colloidal uranium peroxide.

2. In a process for separating uranium combined as an oxide from colloidal dispersions of the lower oxides of uranium in deuterium oxide, the step which comprises contacting the dispersed uranium oxide with deuterium peroxide whereby the uranium is converted to the non-colloidal uranium peroxide, $UO_4$.

References Cited in the file of this patent

Mellor: "Inorganic and Theoretical Chemistry," vol. 12, pages 69–70. Longmans, London (1932).